UNITED STATES PATENT OFFICE.

RICHARD LISSAUER, OF BERLIN, GERMANY.

PROCESS OF PRODUCING LEATHER-LIKE SUBSTANCES.

SPECIFICATION forming part of Letters Patent No. 586,907, dated July 20, 1897.

Application filed November 22, 1895. Serial No. 569,840. (No specimens.)

*To all whom it may concern:*

Be it known that I, RICHARD LISSAUER, a subject of the King of Prussia, Emperor of Germany, and a resident of the city of Berlin, in the Kingdom of Prussia, Germany, have invented certain new and useful Improvements in Processes of Producing Leather-Like Substances; and I do hereby declare that the following is a full, clear, and exact description of the invention, which will enable others skilled in the art to which it appertains to make and use the same.

This invention relates to a process for the production of a leather-like substance. By this process materials containing cellulose fibers and textile materials, such as cotton, linen, and paper, may be transformed into a substance similar to leather and adapted to be used for the soles of shoes and for covering floors and stairs.

The invention consists in the process of thoroughly saturating materials containing cellulose fibers and textile materials with resin dissolved in carbon disulfid.

In carrying out the process materials containing cellulose fibers and textile materials, such as the waste or clippings of cotton, paper, or linen, after being comminuted and cleansed, are passed into a washing and beating engine, where they are brought to a pasty mass, which is poured into forms or molds to form plates or sheets. These are dried and passed into a solution of ammoniac copper, in which they are allowed to remain until the cellulose constituent parts are to a certain extent in a pasty state, whereupon the plates thus prepared are placed in a bath containing albuminates and albuminoids, such as casein, gluten, glue, or blood. The plates or sheets are left in the bath until they are thoroughly saturated with these stuffs, said saturation proceeding the more readily owing to the previous treatment with ammoniac copper. The plates are then passed into a solution of silicate of potassium and after remaining there a length of time into a solution of chlorid of lime. The following process then goes on in the material: From the silicate of potassium and the chlorid of lime there is formed silicate of lime, but at the same time this lime combines in quite a physical way with the absorbed albuminates and albuminoids, joining with these in the form of grains and at the same time carrying with it the cellulose constituents previously treated with the ammoniac copper. In this process a portion of the body of the plates combines most intimately with the added stuffs and in itself, because a large portion of the interstitial air-spaces of the plates are filled with the insoluble fixed constituent parts, which consist partly of organic and partly of inorganic materials. As for the object of this invention the plates must be of different elasticity, so must the processes act on the plates a correspondingly longer or shorter time. The plates are then dried, passed into a bath of carbon disulfid in which resin has been dissolved, and thoroughly saturated with this solution, whereby said plates have given to them the properties and the appearance of leather. The plates are prepared for this saturation by the previous precipitation of the organic and inorganic stuffs. Finally the plates are again dried and pressed.

What I claim as my invention, and desire to secure by Letters Patent, is—

A process for the production of leather-like substances consisting in saturating stuffs or materials containing cellulose fibers, and textile materials, with ammoniac copper and with albuminous substances, treating the material thus obtained with a solution of silicate of potassium and with a solution of chlorid of lime, saturating this material with a solution of resin in carbon disulfid and then drying and pressing the material thus produced, substantially as described.

In testimony whereof I sign this specification in the presence of two subscribing witnesses.

RICHARD LISSAUER.

Witnesses:
TALLI LISSAUER,
W. HAUPT.